United States Patent
Geer et al.

(10) Patent No.: US 12,413,424 B2
(45) Date of Patent: Sep. 9, 2025

(54) SYSTEMS AND METHODS FOR ASSIGNING A CRYPTOGRAPHIC IDENTITY TO NODE-BASED SYSTEMS

(71) Applicant: Hewlett Packard Enterprise Development LP, Houston, TX (US)

(72) Inventors: Kenneth Geer, Aurburn, CA (US); Shiva R. Dasari, Houston, TX (US); Christopher Hillier, Fort Collins, CO (US); Thomas Laffey, Roseville, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 137 days.

(21) Appl. No.: 17/245,610

(22) Filed: Apr. 30, 2021

(65) Prior Publication Data

US 2022/0353093 A1 Nov. 3, 2022

(51) Int. Cl.
*H04L 9/08* (2006.01)
*H04L 9/32* (2006.01)

(52) U.S. Cl.
CPC .......... *H04L 9/3268* (2013.01); *H04L 9/0825* (2013.01)

(58) Field of Classification Search
CPC . H04L 9/3268; H04L 9/0825; H04L 63/0823; H04L 9/3247; H04L 63/0281; H04L 63/083

See application file for complete search history.

(56) References Cited

U.S. PATENT DOCUMENTS

| | | | |
|---|---|---|---|
| 9,621,355 B1 | 4/2017 | Ochmanski et al. | |
| 9,774,452 B2 | 9/2017 | Bjarnason et al. | |
| 9,967,105 B2 | 5/2018 | Chokshi et al. | |
| 10,164,963 B2* | 12/2018 | Ponsini | H04L 63/0823 |
| 10,298,581 B2 | 5/2019 | Shah et al. | |
| 10,311,224 B1* | 6/2019 | Farhan | H04L 9/0897 |
| 11,050,605 B2* | 6/2021 | Gulati | H04L 9/0891 |
| 2002/0080973 A1* | 6/2002 | Cromer | G06F 21/31 |
| | | | 380/282 |
| 2017/0012785 A1* | 1/2017 | Haga | H04L 63/0823 |
| 2018/0150415 A1* | 5/2018 | Wang | G06F 9/445 |
| 2018/0270110 A1* | 9/2018 | Chugtu | H04L 41/0806 |
| 2019/0173880 A1* | 6/2019 | Nakhjiri | H04L 63/029 |
| 2019/0174651 A1* | 6/2019 | Crawford | H05K 7/1497 |
| 2020/0229206 A1* | 7/2020 | Badic | H04W 4/025 |
| 2020/0382519 A1 | 12/2020 | Barton et al. | |
| 2021/0288822 A1* | 9/2021 | Sorensen | H04L 9/3268 |
| 2021/0359843 A1* | 11/2021 | Li | H04L 63/065 |

* cited by examiner

*Primary Examiner* — Hany S. Gadalla
(74) *Attorney, Agent, or Firm* — Trop, Pruner & Hu, P.C.

(57) ABSTRACT

Examples disclosed herein relate to systems and methods for assigning an identifier to a node-based system. For example, systems and methods may: discover the plurality of nodes; determine a node of the plurality of nodes to be a controller node: authenticate, at a management component of the controller node, a respective identifier associated with each node of the plurality of nodes; and based on the authentication, assign a complex identifier to a complex comprising the plurality of nodes, wherein the complex identifier comprises the identifier associated with the controller node.

23 Claims, 8 Drawing Sheets

SYSTEMS AND METHODS FOR ASSIGNING A CRYPTOGRAPHIC IDENTITY TO NODE-BASED SYSTEMS

BACKGROUND

Node-based systems may consist of a number of devices cabled together to form a unit that functions as a single entity. Such systems may be shipped as separate components, which are later assembled at the customer site. Accordingly, the specific devices, or nodes, that will make up the complex may not be known until they are assembled and cannot be authenticated as a complex prior to assembly.

In conventional systems, authenticating and communicating with such multi-node complexes may occur at the node level, with a remote management entity, such as a data center orchestration application or cloud management application, interacting with each individual node, rather than with the multi-node complex as a single entity.

These systems may suffer from increased latency associated with the need to authenticate each node in the multi-node complex. Further, these systems do not efficiently handle failure scenarios involving the multi-node complex. Finally, complexity is introduced if nodes are removed from or added to the complex, as the remote management entity keeps track of each node in the multi-node complex.

BRIEF DESCRIPTION OF THE DRAWINGS

The following detailed description references the drawings, wherein.

Figure 1:
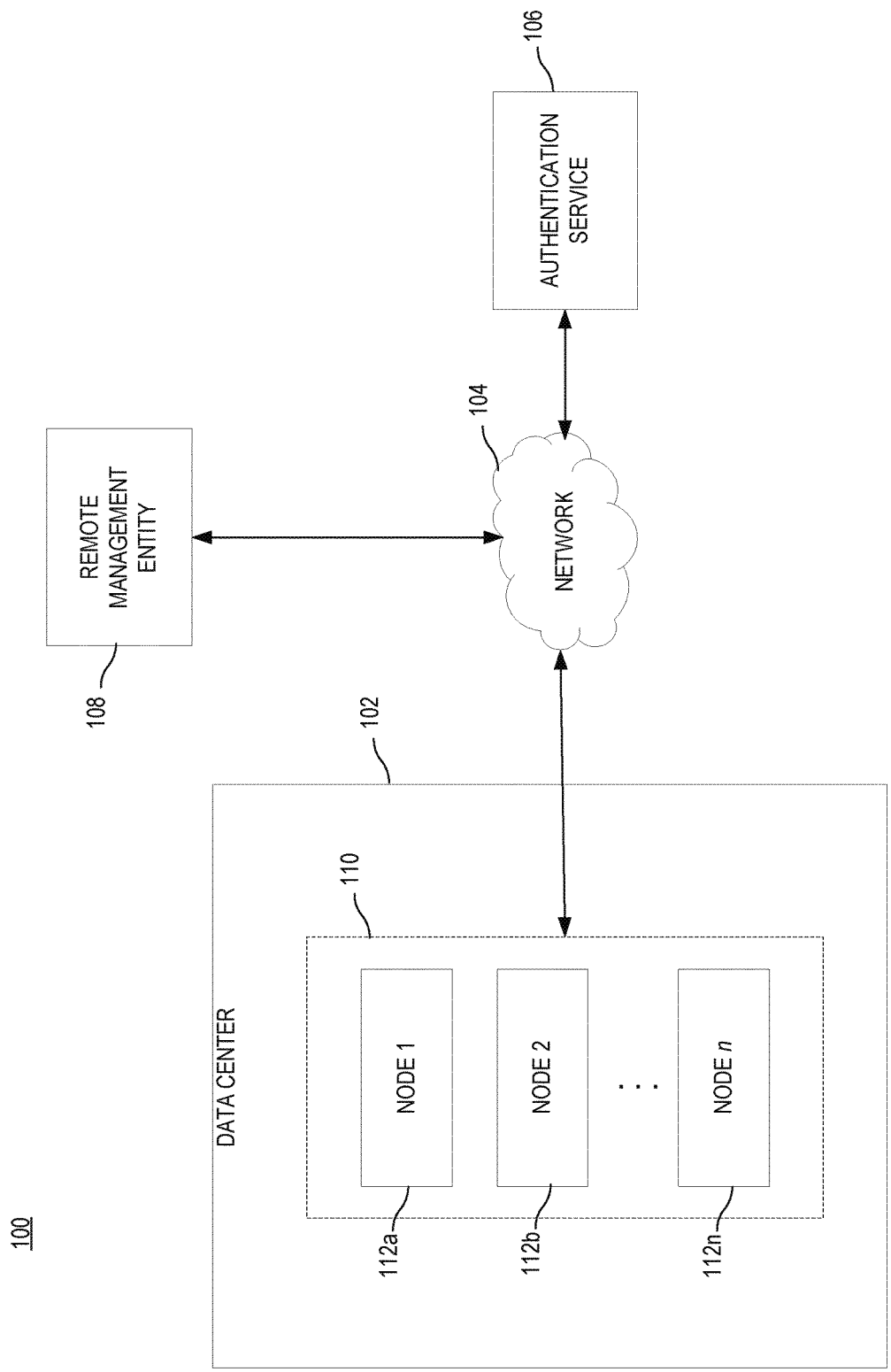
FIG. 1 is a block diagram of an example network system, in accordance with disclosed embodiments.

Throughout the drawings, identical reference numbers may designate similar, but not necessarily identical, elements. An index number "N" appended to some of the reference numerals may be understood to merely denote plurality and may not necessarily represent the same quantity for each reference numeral having such an index number "N". Additionally, use herein of a reference numeral without an index number, where such reference numeral is referred to elsewhere with an index number, may be a general reference to the corresponding plural elements, collectively or individually. In another example, an index number of "I," "M," etc. can be used in place of index number N.

Throughout the drawings, identical reference numbers designate similar, but not necessarily identical, elements. The figures are not necessarily to scale, and the size of some parts may be exaggerated to more dearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

As used herein, "node" may refer to a networked device. In some embodiments, the networked device may be authenticated prior to establishing trusted communication with a network and/or other components of a data center. For example, a node may include a memory, storage, a resource monitoring and control component, and at least one processor. In some embodiments, a server may be a cabled complex of nodes. A customer data center may detect a number of physical or logical devices upon integration of the nodes. For example, the data center may detect a resource monitoring and control (RMC) component associated with each node, a failover RMC, and/or one or more server partitions (e.g., collections of nodes forming a bootable server hosting an operating system (OS)).

As detailed above, node-based systems are often shipped from the manufacturer as separate devices and assembled at the customer site. Because the nodes may not integrate for the first time until reaching the customer, these separate devices, or nodes, may each require separate authentication upon connection to a network or data center to establish trusted communication. However, authenticating each separate node may use time and resources. For example, where each node is authenticated based on a unique cryptographic identifier, a remote management entity, such as a data center agent, must authenticate each node individually to authenticate the entire complex of nodes. Accordingly, the remote management entity will implement and maintain the logic required to understand which nodes form the complex and compare the results of that logic to each identifier being presented to the remote management entity during various communications and/or processes.

Further, the data center agent may implement logic to track the addition or removal of nodes to and from the complex. Thus, there is a need to consistently and accurately represent a node-based system to a data center (e.g., data center agent) as a single entity. For example, by representing the node-based system as a single entity, the data center agent is no longer responsible for authenticating and tracking the addition and removal of nodes to the node-based system.

Representing a multi-node system as a single entity (e.g., by using a single identifier to represent the nodes of the complex) may give a logical device (e.g., an RMC), an identifier that may be used to represent the multi-node complex. Additionally, the identifier may need to be based on manageability, data, and internal local area network (LAN) components.

Disclosed embodiments facilitate the representation of a multi-node complex to a system as a single entity and eliminate the need to repeatedly authenticate each individual node by representing the complex of nodes as a single entity. Using a single identifier to represent the complex of nodes enables devices (e.g., logical and/or physical devices) of the complex to leverage the identifier in communicating with a remote management entity, such as a data center agent. For example, disclosed embodiments may leverage a cryptographic identifier from a single node in the complex to represent the entire complex of nodes to the remote management entity. Thus, disclosed embodiments may eliminate the need for a remote management entity to authenticate each separate node in order to authenticate the complex and establish trusted communication. For example, the authentication of each node may be performed by a controller node of the multi-node complex rather than the data center agent.

In some embodiments, upon installation and cabling of one or more nodes into a rack, a remote management entity, such as a data center agent, may discover each installed node. However, before a network may trust a node or network device, the node and/or device may be authenticated by the remote management entity using an authentication service or other means of authentication. In some embodiments, information describing how the complex is assembled may be stored remotely, e.g., by a remote management entity. In other embodiments, information describing how the complex is assembled may be stored locally by the complex, for example, by the controller node. As an example, information describing how the complex is assembled may include information identifying the nodes forming the complex and their configurations.

In some embodiments, the multi-node complex may further determine a node of the one or more nodes to act as a controller node. As used herein, "controller node" refers to a device (e.g., a logical and/or physical device) or node that may represent the group of nodes to the remote management entity. The controller node may be identified at the time of installation based on, for example, the order in which the node is connected within the rack, the cabling configuration of the one or more nodes, or other factors.

Upon connection of the one or more nodes, a management component of the controller node may authenticate a respective identifier of each of the one or more nodes. The respective identifier may be a cryptographic identifier, a certificate, etc. In some embodiments, each node may have an immutable certificate installed at manufacturing. The certificate may be, for example, an X.509 certificate, e.g., an IEEE 802.1AR secure device identity certificate. In some embodiments, an identifier may be assigned to each node by the manufacturer. In other embodiments, an identifier may be assigned to each node by the customer, or end user. In another embodiment, the identifiers of the individual nodes may be installed by the node manufacturer, while the identifier representing the complex may be a field-installed identifier issued by or for the end user.

FIG. 1 is a block diagram of an example system 100, in accordance with disclosed embodiments. The system 100 may include a data center 102 and authentication service 106, which are communicatively coupled via network 104. The data center 102 may further include a remote management entity 108 (e.g., a data center agent) and a server 110 having one or more nodes (112a through 112n). In certain examples, the authentication service 106 and remote management entity 108 are computing devices, such as servers, client computers, desktop computers, mobile computers, etc. In other examples, the authentication service 106 and remote management entity 108 can include special purpose machines. The authentication service 106 and remote management entity 108 can be implemented via a processing element, memory, and/or other components.

Data center 102 may include one or more servers, e.g., server 110 configured to communicate with a remote data center agent (remote management entity 108). As used herein, a data center may refer to a collection of hardware and software components configured to enable a customer to access a computing resource, host environment, or cloud environment. For example, data center 102 may enable a customer to access any type of network-accessible service. Data center 102 may include a number of additional hardware or infrastructure devices not shown in FIG. 1.

Remote management entity 108 may be a server, computing device, or other combination of hardware, firmware, and software configured to manage one or more components of data center 102. In some embodiments, remote management entity 108 may be a data center orchestration application or cloud management application. Remote management entity 108 may be a component of a server or other computing system configured to provide access to a network-accessible service. In other embodiments (not shown), the remote management entity 108 may be an on-premises component of the data center 102 configured to communicate with other systems.

Server 110 may be a cabled complex of devices, or nodes (e.g., nodes 112a through 112n). For example, a device may be hardware including a processing device, memory, and storage. Server 110 may be one or a number of servers included in data center 102 and may be managed by remote management entity 108 to enable customer use of data center computing resources. Remote management entity 108 may be configured to communicate with and manage each node (e.g., nodes 112a through 112n) of server 110. Described herein, in some embodiments, remote management entity 108 may communicate with and manage the entire complex of nodes (e.g., server 110) as a single entity represented by an identifier.

The network 104 may use wired communications, wireless communications, or combinations thereof. Further, the network 104 may include multiple sub-communication networks such as data networks, wireless networks, telephony networks, etc. Such networks can include, for example, a public data network such as the Internet, local area networks (LANs), wide area networks (WANs), metropolitan area networks (MANs), cable networks, fiber optic networks, combinations thereof, or the like. In certain examples, wireless networks may include cellular networks, satellite communications, wireless LANs, etc. Further, the network 104 can be in the form of a direct network link between devices. Various communications structures and infrastructure can be utilized to implement the communication network(s).

By way of example, components of data center 102 (e.g., server 110), authentication service 106, remote management entity 108, and one or more client devices (not shown) may communicate with each other and other components with access to the network 104 via a communication protocol or multiple protocols. A protocol can be a set of rules that defines how nodes of the network 104 interact with other nodes. Further, communications between network nodes can be implemented by exchanging discrete packets of data or sending messages. Packets can include header information associated with a protocol (e.g., information on the location of the network node(s) to contact) as well as payload information.

Authentication service 106 may be a server or other computing device configured to provide authentication of hardware or software components of system 100 based on their respective identifiers. In some embodiments, authentication service 106 may be a component of data center 102. In other embodiments (e.g., as illustrated), authentication service 106 may be a remote service configured to provide authentication functionality to one or more data centers. In other embodiments (not shown) remote management entity 108 and authentication service 106 may be components of the same server, system, or computing device.

Authentication service 106 may be configured to enable authentication of nodes 1 through n (e.g., nodes 112a through 112n). For example, upon installing and connecting nodes 112a through 112n in a server rack, authentication service 106 may receive, from each node, an identifier (e.g., a signed certificate), which, in turn, may be used by authentication service 106 to validate each node. Accordingly, upon initial installation, each node may be authenticated by authentication service 106 prior to communication with the network 104, remote management entity 108, and other components of data center 102. In some embodiments, a separate authentication service may be configured to authenticate the identifier presented to remote management entity 108, where the presented identifier represents the multi-node complex 110.

Figure 2:
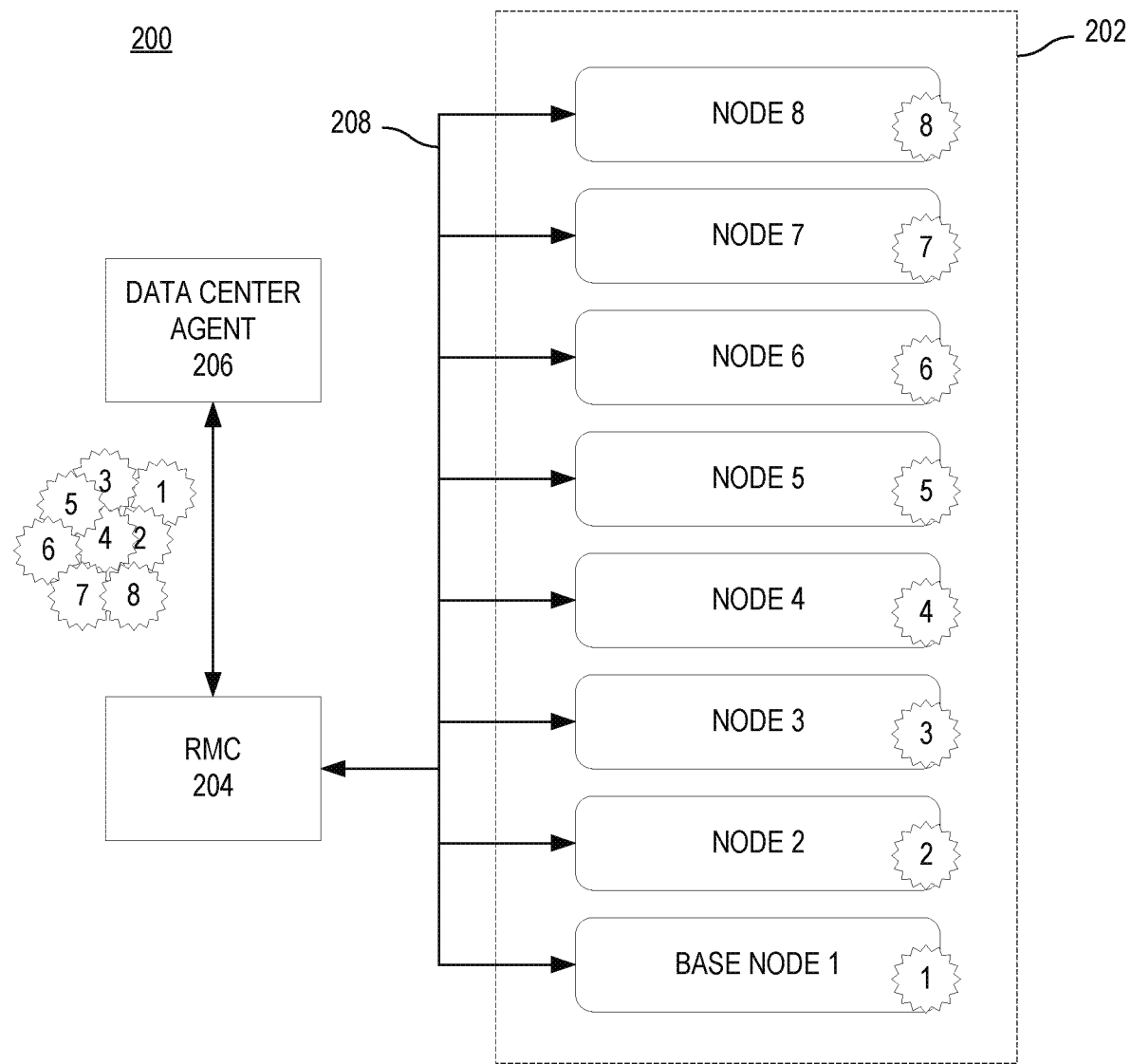
FIG. 2 is a block diagram of an example system, in accordance with disclosed embodiments.

FIG. 2 is a block diagram of an example system 200. System 200 may include eight nodes (e.g., Node 1 through Node 8) connected by internal manageability LAN 208, which form a server complex 202. The complex 202 may further include an RMC 204 configured to represent the complex to data center agent 206. Each node of complex 202 may include an identifier 1 through 8, respectively.

In conventional systems, upon installation, data center agent 206 may authenticate all identifiers (e.g., 1 through 8) associated with each node of complex 202. Thus, rather than leveraging a single identifier, (for example, a certificate) associated with the complex, RMC 204 communicates with data center agent 206 to authenticate each identifier associated with individual nodes within the complex. Further, data center agent 206 may manage and communicate with each individual node of the complex, rather than communicating with and managing the complex as a single entity. Accordingly, this required data center agent 206 to have knowledge and logic to recognize which individual nodes are part of a specific complex, noting that the data center agent might be communicating with several complexes As will be described below with reference to FIGS. 3A, 3B, and 4, disclosed embodiments enable a multi-node complex to be represented as a single entity. For example, rather than a data center agent communicating with each individual node of the complex, disclosed embodiments enable the complex to be authenticated as a single entity and represented to the data center agent as a single entity.

Figure 3A:
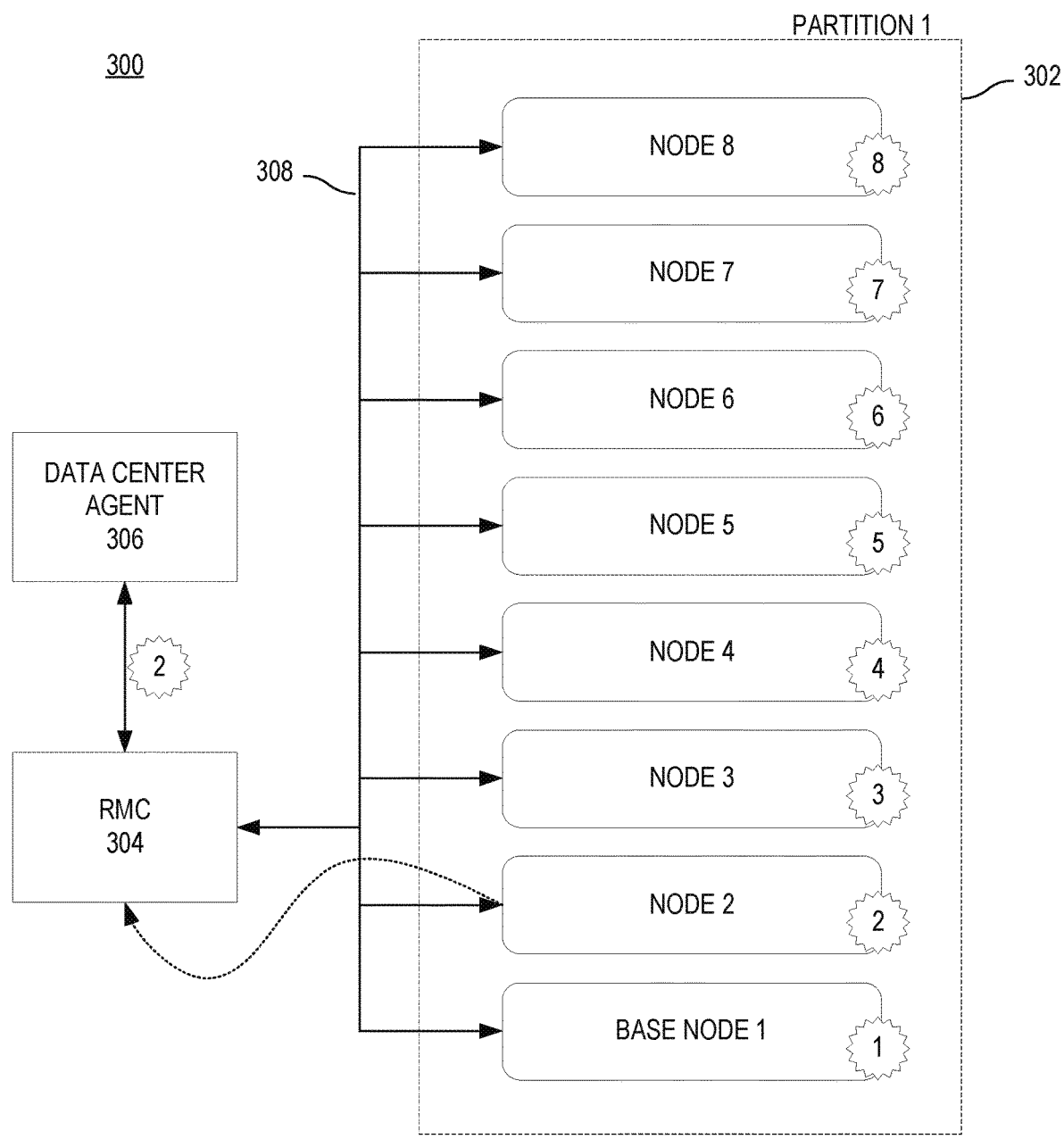
FIG. 3A is an illustration of an example system configuration, in accordance with disclosed embodiments.

FIG. 3A is an illustration of an example system 300, in accordance with disclosed embodiments. The various elements of system 300 may be similar or substantially similar to those described with reference to FIG. 1. Other arrangements are possible.

System 300 may include a complex 302 of nodes (e.g., Node 1 through Node 8). In this example, Nodes 1 through 8 may form a single partition, Partition 1 and may be communicatively connected via internal manageability LAN 308. Further, in this example, system 300 may select Node 2 to act as a controller node of the complex. Accordingly, the RMC 304 of the controller node, Node 2, may initially authenticate the identifiers 1 through 8. In some embodiments, RMC 304 may be a logical RMC device.

As an example, each node may be authenticated by an authentication service (e.g., authentication service 106) based on an identifier associated with the node. The identifier may be, for example, cryptographic identifier such as a certificate or may be another form of cryptographic identifier.

Subsequent to the authentication of each node, the entire complex 302 may be represented to data center agent 306 using the identifier of Node 2, the controller node. This obviates the need for the data center agent 306 to authenticate each and every identifier associated with a node within the complex. Further, this facilitates management of and communication with the complex as a single entity, regardless of whether individual nodes within the complex have been added or removed. For example, subsequent connections with data center agent 306 may be authenticated using the identifier of the complex before data is transmitted or accepted.

Figure 3B:
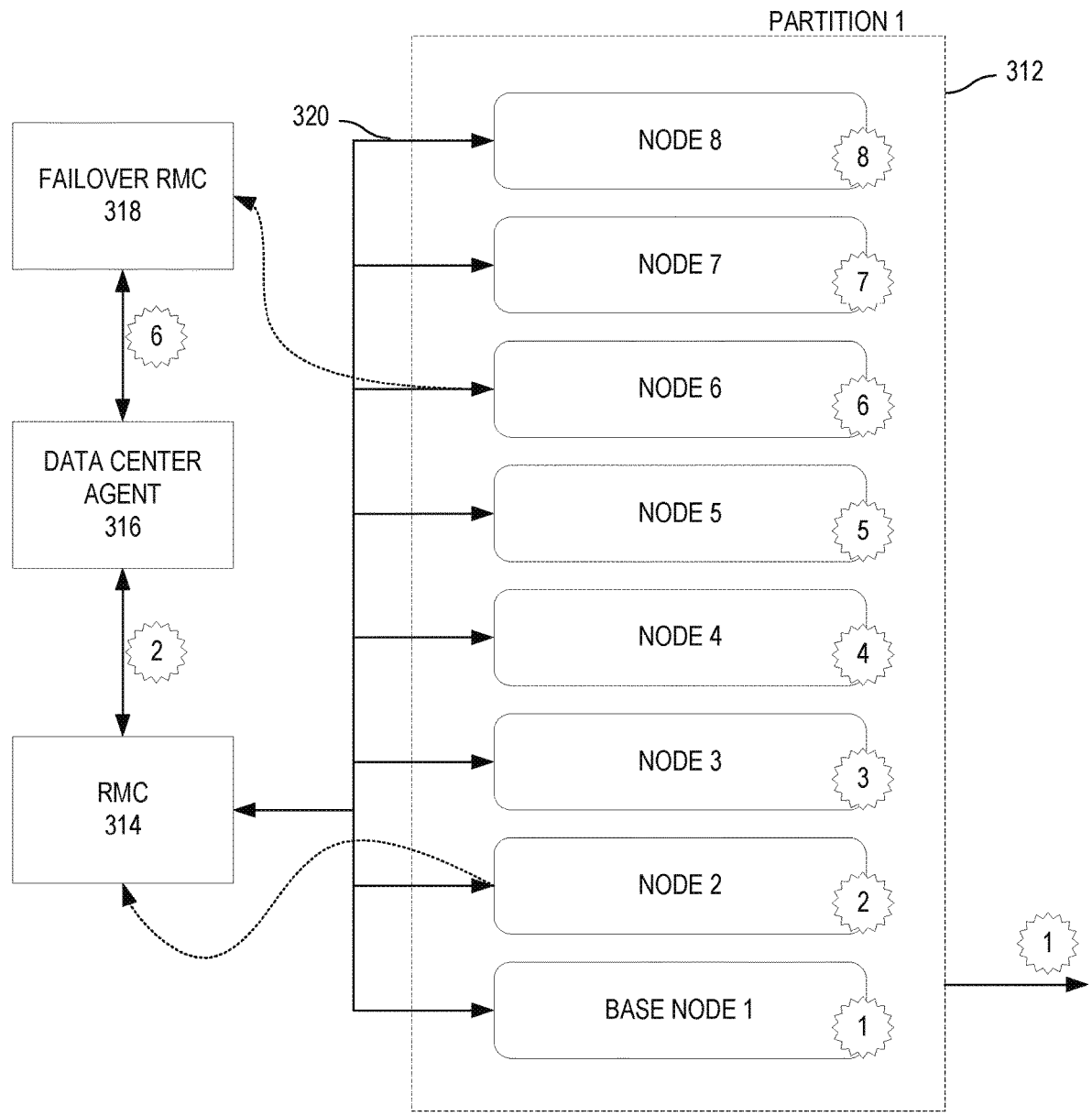
FIG. 3B is an illustration of another example system configuration, in accordance with disclosed embodiments.

FIG. 3B is an illustration of an example system 310, in accordance with disclosed embodiments. The various elements of system 310 may be similar or substantially similar to those described with reference to FIGS. 1 and 3A. Other arrangements are possible.

System 310 may include a complex 312 of nodes (e.g., Node 1 through Node 8). In this example, Nodes 1 through 8 may form a single partition, Partition 1, and may be communicatively connected via internal manageability LAN 320. As previously discussed, a complex, e.g., complex 312, may expose one or more logical devices (e.g., RMC 314, failover RMC 318, and Partition 1) to data center agent 316 and/or other data center components. Each of these logical devices may be represented by an identifier (e.g., a cryptographic identifier) of a node of the complex 312, thereby eliminating the need for data center agent 316 to authenticate or manage each node. For example, Partition 1 may be presented to a data plane by a single identifier.

For example, for each logical device, system 310 may select a controller node. Various methods may be used to select the controller node from among the nodes. These methods may be known to one of skill in the art. In this example, Node 2 is selected as the controller node for RMC 314, Node 6 is selected as the controller node for failover RMC 318, and Base Node 1 is selected as the controller node for Partition 1. RMC 314 may authenticate Nodes 1 through 8. As an example, each node may be authenticated by an authentication service (e.g., authentication service 106) based on an identifier associated with the node. The identifier may be a certificate or other form of cryptographic identifier. Once each node is authenticated, the identifiers associated with the selected controller nodes may be used to represent each entity (e.g., the complex, the complex in a failover scenario, and Partition 1).

Subsequent to the authentication of each node, the complex 312 may be represented to data center agent 316 using the identifier of Node 2, the controller node. Further, in a failover scenario, failover RMC 318 may authenticate each node of the complex. Subsequently, the identifier (e.g., a certificate or other cryptographic identifier) of Node 6 may be used by failover RMC 318 to authenticate the complex 312 with data center agent 316. In some embodiments, the identifier of Node 1 may be used to represent Partition 1 to, for example, a data plane process or device, or to the data center agent 316.

Figure 4:
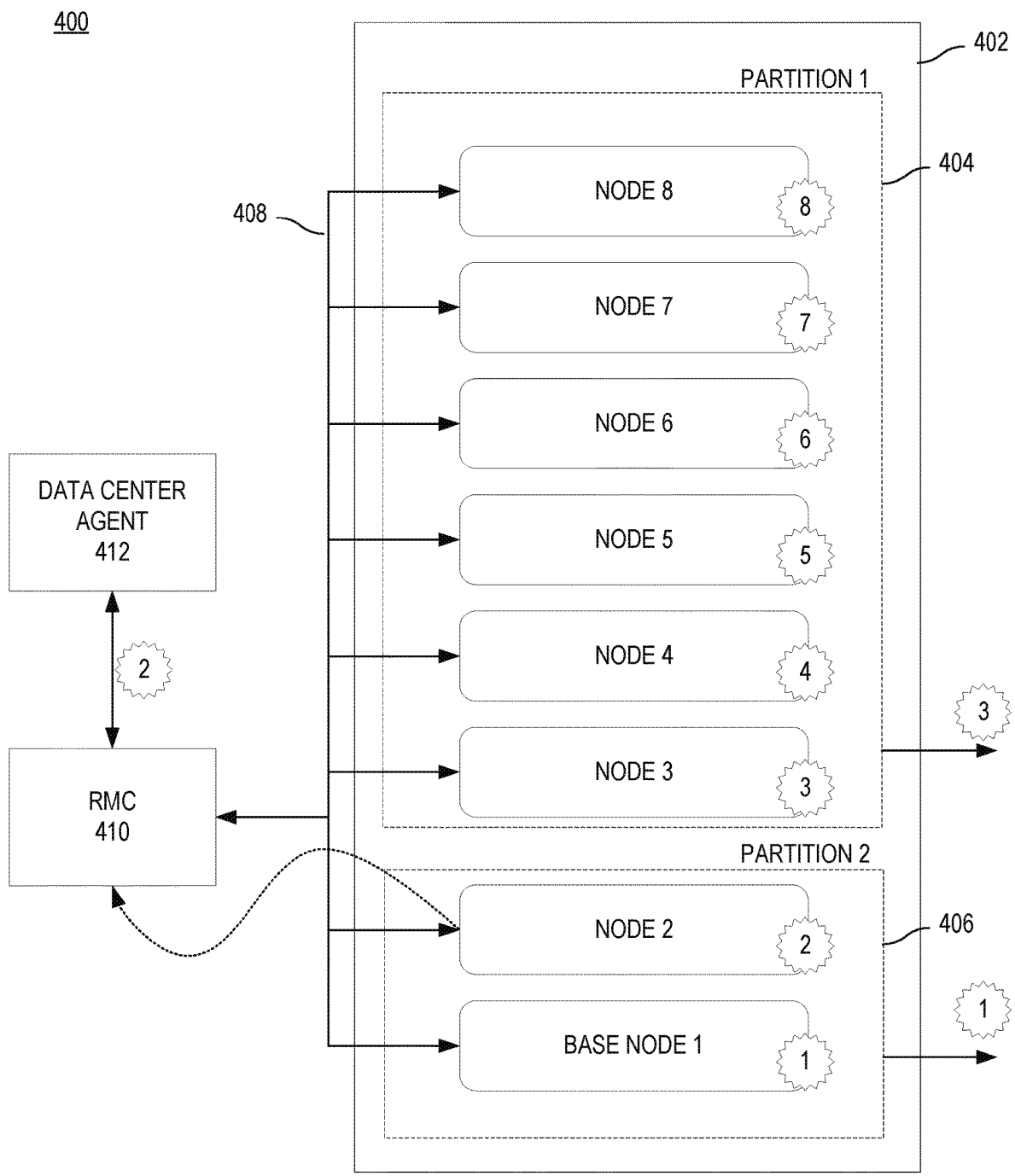
FIG. 4 is an illustration of another example system configuration, in accordance with disclosed embodiments.

FIG. 4 is an illustration of another example system 400, in accordance with disclosed embodiments. The various elements of system 400 may be similar or substantially similar to those described with reference to FIG. 1 and FIGS. 3A and 3B. Other arrangements are possible.

System 400 may include a complex 402 of nodes (e.g., Node 1 through Node 8). In this example, Nodes 3 through 8 may form a partition 404 and Nodes 1 and 2 may form a second partition 406. Nodes 1 through 8 may be communicatively connected via internal manageability LAN 408.

Node 2 may be selected to represent the complex 402 of Nodes 1 through 8 to data center agent 412. Further, in this example, system 400 may select Node 3 to act as a controller node of partition 404 and may select Node 1 to act as controller node of partition 406.

In some embodiments, the RMC 410 of the controller node, Node 2, may initially authenticate the identifiers 1 through 8. Once the nodes are authenticated, the respective partitions, partition 404 and partition 406, may each be represented as a single entity by the identifier associated with the respective controller nodes. For example, the identifier of Node 3 may be used to represent partition 404 during communications with a data center, a data plane process, etc.

As an example, an operating system (OS), or an OS driver or application, may be running on partition 406. When the OS requires an identifier, e.g., a cryptographic identifier, to represent the server, e.g., to another server or application on a data plane, the other server or application may receive the single identifier of the controller node, Node 1, as a representation of the entire partition.

In some embodiments, e.g., in a storage system, each node may be a drive enclosure. The functionality described with reference to an RMC, e.g., RMC 410, may be executed by an array controller. Accordingly, the array controller may authenticate each drive enclosure in a group of drive enclosures. Upon successful authentication, the group of drive enclosures may be represented to a data center agent (e.g., data center agent 412) by the identifier or certificate associated with the array of drive enclosures. Similar to the advantages described above, in this embodiment enables the group of drive enclosures may be represented to a data center agent as a single entity.

Figure 5:
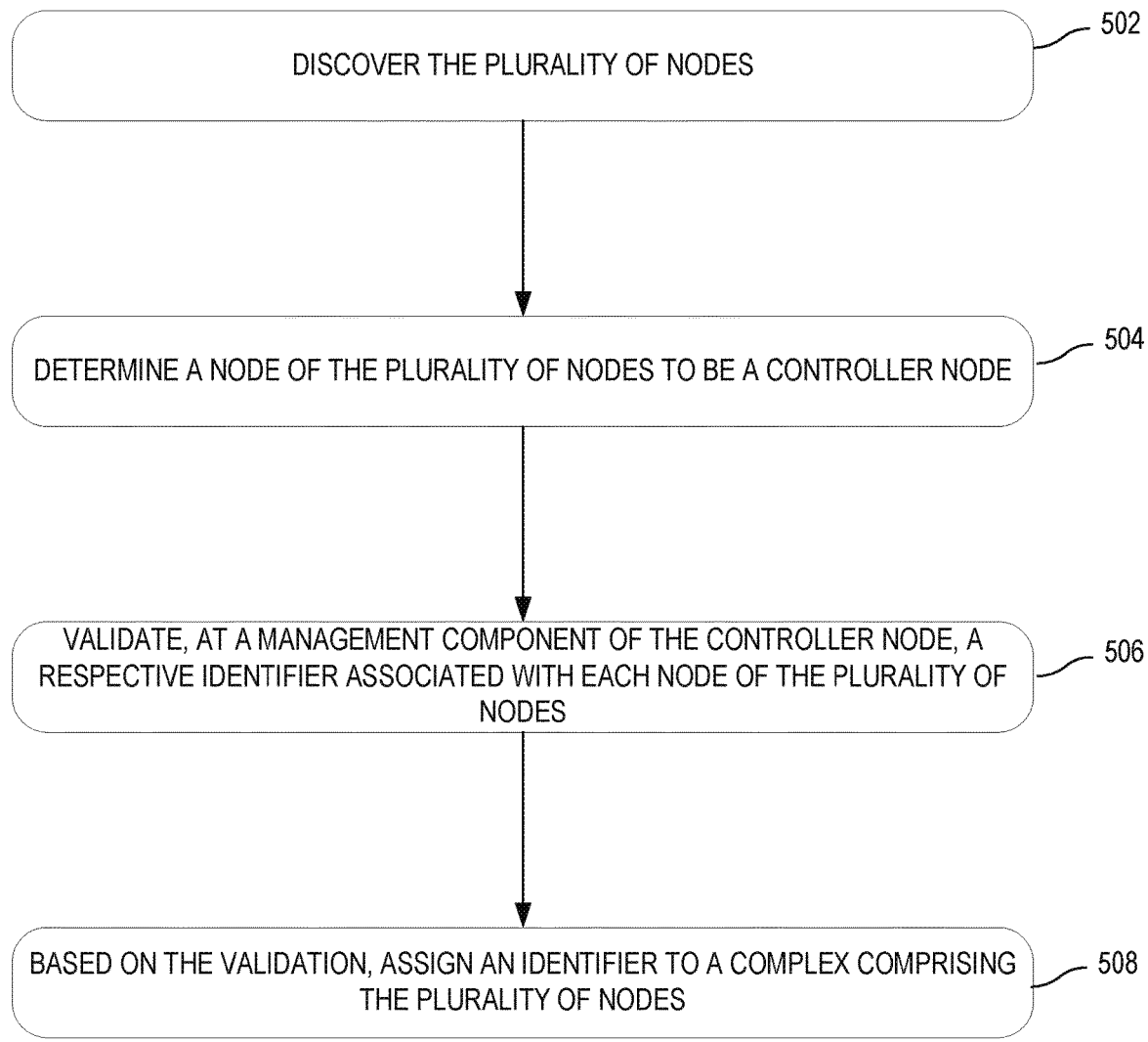
FIG. 5 is a flowchart illustrating an example method for authenticating and representing a complex of nodes, in accordance with disclosed embodiments.

FIG. 5 is a flowchart of a method 500 for representing a complex of nodes as a single entity, in accordance with disclosed embodiments. Although execution of method 500 is described below with reference to system 100, method 500 may be executed by system 300, system 310, and/or system 400. Additionally, the components for executing the method 500 may be spread among multiple devices. Method 500 may be implemented in the form of executable instructions stored on a machine-readable storage medium and/or in the form of electronic circuitry.

At step 502, the system may discover a plurality of nodes. For example, the nodes may be one or more network devices cabled together to form a server complex. Upon installation, the nodes may be discovered by a data center system. For example, when a node or the complex of nodes comes online, method 500 may be triggered.

At step 504, the system may determine a node of the plurality of nodes to be a controller node. Various methods may be used to determine the controller node. For example, the controller node may be the node that is connected to the data center first. In other embodiments, the controller node may be designated based on a particular hardware configuration of the node, based on a quorum reached among the nodes, or based on other methods known to one skilled in the art. In another example, the controller node may be the node having either the highest or lowest Ethernet media access control (MAC) address of the group of nodes.

At step 506, the system may authenticate, at a management component of the controller node, a respective identifier associated with each node of the identifier. Each identifier may be a certificate signed by a certificate authority (CA) or may be any other cryptographic identifier. The authentication of each node of the complex will be further described below with reference to FIG. 6.

At step 508, based on the authentication, the system may assign an identifier to a complex comprising the plurality of nodes. For example, upon successful authentication of each node of the plurality of nodes, the system may assign the identifier of the controller node as an identifier for the complex of nodes. In other embodiments, the identifier of the complex may be an identifier or certificate issued to or for an end user of the complex of nodes.

Subsequent to the assignment of the identifier to the complex, the complex may be authenticated by a data center agent based on the identifier of the complex. For example, the data center agent may extract, among other information, a public key, model number, and serial number, from the chosen identifier (e.g., the identifier associated with the controller node). The data center agent may authenticate the identifier of the complex using the public key and the serial number and/or model number. Based on the authentication, the system may establish a trusted connection with the complex. This process is explained in further detail below with reference to FIG. 7.

Figure 6:
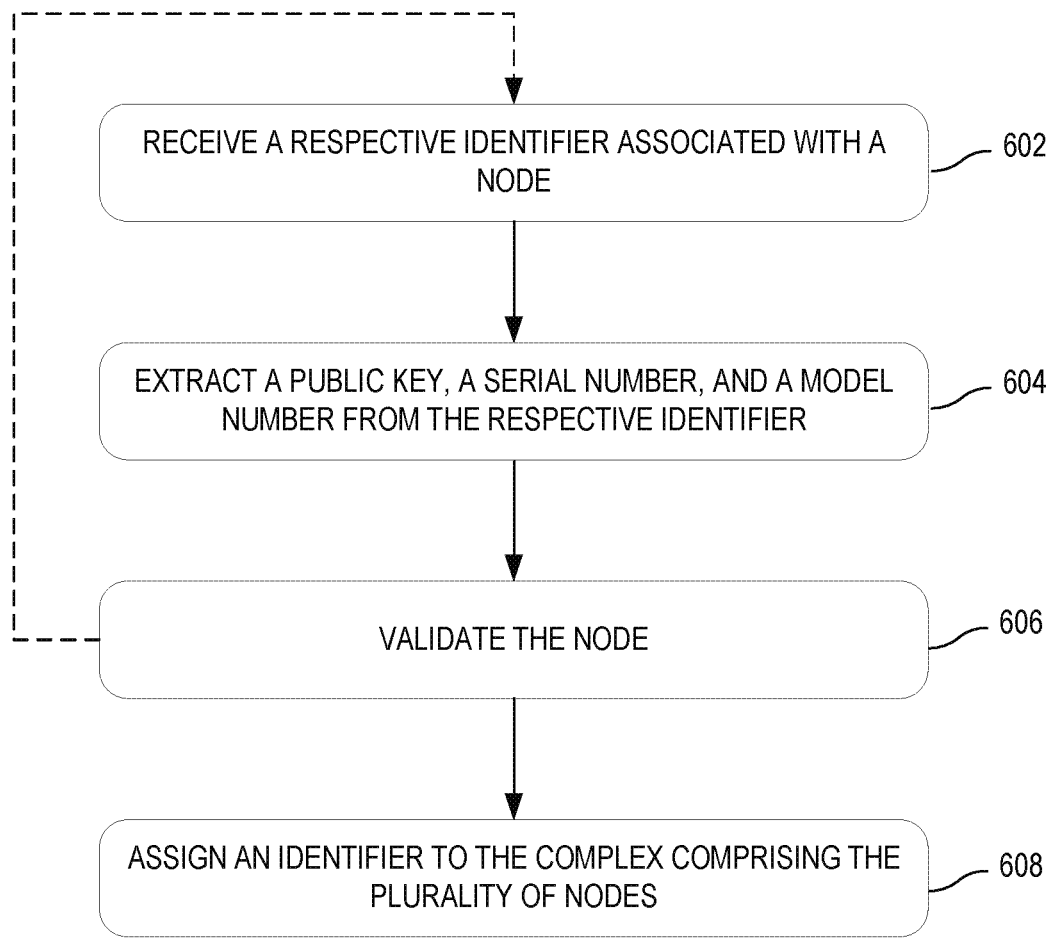
FIG. 6 is a flowchart illustrating an example method for authenticating each node of a complex of nodes, in accordance with disclosed embodiments.

FIG. 6 is a flowchart of a method 600 for authenticating, by a management component of a controller node, each node of a complex of nodes, in accordance with disclosed embodiments. Although execution of method 600 is described below with reference to system 100, method 600 may be executed by system 300, 310, or 400. Additionally, the components for executing the method 600 may be spread among multiple devices. Method 600 may be implemented in the form of executable instructions stored on a machine-readable storage medium and/or in the form of electronic circuitry.

At step 602, a controller node may receive an identifier (e.g., a certificate) associated with another node. For example, upon installation of a number of nodes, the controller node may discover the installed node and begin the process of authenticating the installed node. In some embodiments, the controller node may perform the authentication process on itself in addition to the other nodes in the complex. In other embodiments, authentication of the controller node may be quorum-based authentication or authentication of the controller node may be performed against an inventory of nodes that are trusted in the field. Further, in some embodiments, each node may execute an authentication process to authenticate itself prior to using its identifier outside the node.

At step 604, a management component, e.g., an RMC, of the control node may extract from the identifier a public key, and a serial number and/or model number. For example, the identifier may be an X.509 certificate signed by a certificate authority associated with the manufacturer of the node.

At step 606, the management component of the controller node may authenticate the node using the extracted data. For example, the management component may verify that the serial number and model number extracted from the certificate match an expected respective value. In some embodiments, the management component may confirm that the certificate is valid, e.g., it is not expired, and trusted, e.g., that it was signed by a trusted certificate authority.

In some embodiments, at step 606, the identifier, or certificate, associated with the node may be provided to an authentication service, e.g., authentication service 106, for authentication. In other embodiments, the identifier may be authentication by a component of the controller node or by an authentication service of the data center.

In some embodiments, if the node cannot be authenticated, an alert may be generated and sent to a system administrator. In some embodiments, complex may operate only with those nodes that were successfully authenticated.

Steps 602 through 606 may be repeated for each node in the complex. Thus, the management component of the controller node may authenticate each node of the complex prior to connection to a system such as a data center.

At step 608, the system may assign a complex identifier to the plurality of nodes. For example, upon successful authentication of each node, the controller node may determine that the node's associated identifier will be used to authenticate the complex of nodes with a remote management entity, e.g., data center agent of the data center.

In some embodiments, in which the nodes are grouped into partitions, the controller node of the complex may select, from among the nodes, an identifier associated with one of the nodes to represent a partition. In other embodiments, each partition may be associated with a controller node whose identifier may be used to identify the partition. The number or organization of controller nodes may be based on, for example, the system architecture and/or the rules governing server architecture. The identifier of the partition may be used to represent the partition as a single entity to another server or application on a data plane.

Method 600 may kick off in response to installation of the plurality of nodes. In other embodiments, method 600 may be initiated when controller node is removed from the complex and replaced with a different node. For example, an authentication process may be triggered when a newly added node comes online.

Figure 7:
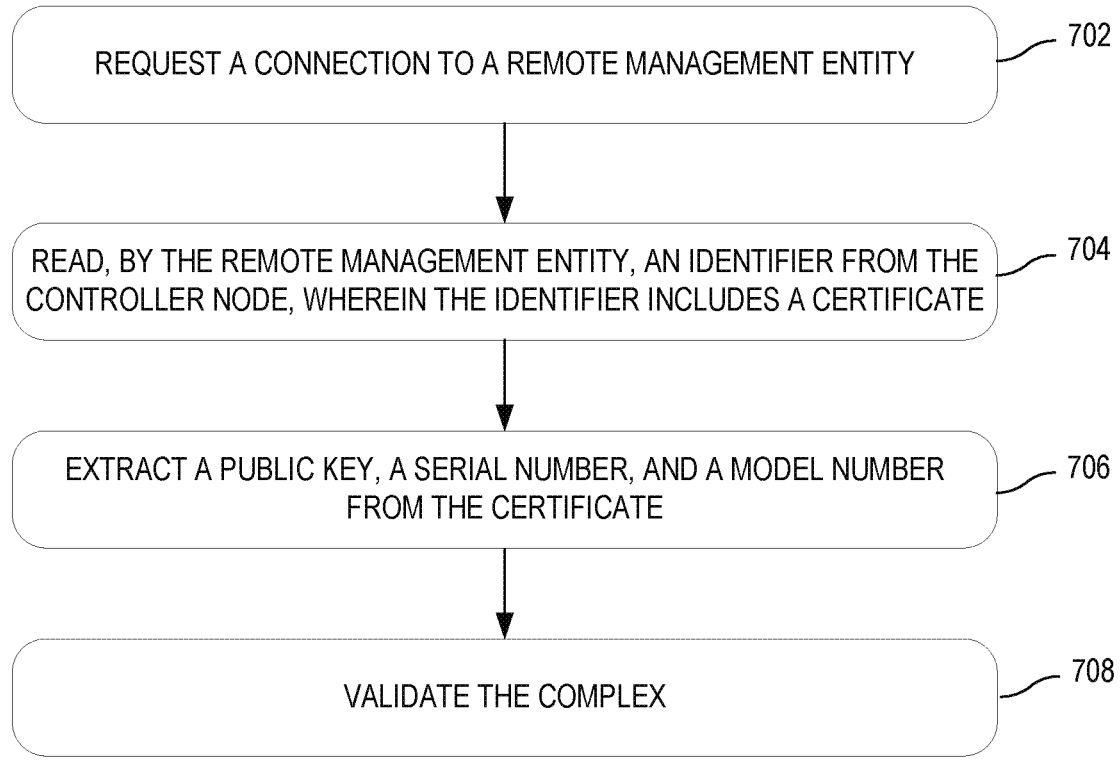
FIG. 7 is a flowchart illustrating an example method for authenticating a complex of nodes, in accordance with disclosed embodiments.

FIG. 7 is a flowchart of a method 700 for authenticating, by a remote management entity, such as data center agent of a data center, a complex of nodes, in accordance with disclosed embodiments. Although execution of method 700 is described below with reference to system 100, method 700 may be executed by system 300, 310, or 400. Additionally, the components for executing the method 700 may be spread among multiple devices. Method 700 may be implemented in the form of executable instructions stored on a machine-readable storage medium and/or in the form of electronic circuitry.

At step 702, the controller node of a complex of nodes may initiate a connection to a remote management entity, e.g., remote management entity 108. For example, the controller node may establish a connection to the remote management entity 108 after completing the steps of method 600 described above.

At step 704, the remote management entity may read an identifier, e.g., the identifier of the complex, from the controller node. The identifier of the complex may be, for example, a cryptographic identifier, such as a certificate stored on the controller node. For example, the identifier may be a certificate signed by a CA.

At step 706, the remote management entity may extract from the certificate a public key, and a serial number and/or model number from the certificate. For example, one or more extraction techniques known to one of reasonable skill in the art may be used to extract information from the certificate.

At step 708, the remote management entity may authenticate the complex using the extracted data. For example, the remote management entity may verify that the serial number and model number extracted from the certificate match an expected respective value. In some embodiments, the management component may confirm that the certificate is valid, e.g., it is not expired, and trusted, e.g., that it was signed by a trusted certificate authority. In some embodiments, the authentication of the identifier representing the complex may be performed by an authentication service, e.g., authentication service 106.

In an example, the controller node may receive a nonce from an organization verification (OV), sign the nonce, and transmit the signed nonce to the OV system. The OV system may authenticate the complex based on the signed nonce using the public key. In some embodiments, the OV system may also validate the model number and/or serial number extracted from the identifier.

Accordingly, the entire complex may be authenticated using the identifier, e.g., certificate, of the controller node. Because the controller node authenticated each node of the complex, the identifier of the controller node may be used to establish a trusted connection between the entire complex of nodes and the remote management entity. Upon authentication, the complex, or partition in some embodiments, may establish trusted communication with a remote management entity or other computing device.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described. Thus, features described with reference to one or more implementations can be combined with other implementations described herein.

What is claimed is:

1. A system comprising:
    a server comprising a plurality of nodes, wherein the server to initiate a connection with a management entity other than the server and responsive to the connection, provide a server identifier to the management entity to allow the management entity to authenticate the server, and each node of the plurality of nodes is associated with a respective identifier;
    a memory device storing instructions; and
    at least one processing device configured to execute the instructions to:
        discover the plurality of nodes;
        determine a node of the plurality of nodes to be a controller node;
        authenticate, at a management component of the controller node, a respective identifier associated with each node of the plurality of nodes; and
        based on the authentication successfully authenticating each node of the plurality of nodes, assign the server identifier to the server,
    wherein the server to communicate, as a single unit, with an entity external to the server using the server identifier.

2. The system of claim 1, wherein the respective identifier associated with each node of the plurality of nodes comprises a cryptographic identifier.

3. The system of claim 1, wherein the instructions further configure the at least one processing device to determine the node to be the controller node based on an order in which each of the plurality of nodes are cabled together.

4. The system of claim 1, wherein authenticating the respective identifier of each node of the plurality of nodes comprises:

providing the respective identifier to an authentication service, wherein each respective identifier comprises a certificate; and authenticating, by the authentication service, the certificate.

5. The system of claim 1, wherein the instructions further configure the at least one processing device to:

at a time subsequent to the authentication successfully authenticating each node of the plurality of nodes, establish a connection to the management entity;

authenticate the server to the management entity based on the server identifier.

6. The system of claim 5, wherein the server identifier comprises a certificate associated with a public key and at least one of: a model number of the controller node or a serial number of the controller node.

7. The system of claim 6, wherein authenticating the server to the management entity comprises:

providing the certificate to an authentication service; and authenticating, by the authentication service, the certificate, wherein authenticating the certificate comprises determining that the certificate is valid and trusted.

8. The system of claim 1, wherein the management component comprises at least one of a physical management component, a logical management component, or an array controller.

9. The system of claim 1, wherein each node of the plurality of nodes are in a rack and wherein each node of the plurality of nodes comprises memory, a resource monitoring and control component, and at least one processor.

10. The system of claim 1, wherein the server identifier comprises the respective identifier associated with a node of the plurality of nodes.

11. The system of claim 1, wherein authenticating the respective identifier of each node of the plurality of nodes comprises:

comparing a first value represented by the respective identifier to a second value expected to be represented by the respective identifier; and determining whether the each node passes authentication based on a result of the comparison.

12. A method comprising:

discovering a plurality of nodes, wherein each node of the plurality of nodes is associated with a respective identifier, and the plurality of nodes collectively form a server;

determining a node of the plurality of nodes to be a controller node;

authenticating, at a management component of the controller node, a respective identifier associated with each node of the plurality of nodes;

responsive to the authentication successfully authenticating each node of the plurality of nodes, assigning a server identifier to the server; and communicating, by the server as a single unit, with an entity external to the server using the server identifier.

13. The method of claim 12, wherein the respective identifier associated with each node of the plurality of nodes comprises a cryptographic identifier.

14. The method of claim 12, wherein validating the respective identifier associated with each node of the plurality of nodes comprises comparing at least one of a respective model number or respective serial number associated with each node of the plurality of nodes against an expected value.

15. The method of claim 12, wherein authenticating the respective identifier of each node of the plurality of nodes comprises:

providing the respective identifier to an authentication service, wherein each respective identifier comprises a certificate; and authenticating, by the authentication service, the certificate.

16. The method of claim 12, further comprising:

at a time subsequent to the authentication, establishing a connection to a remote management entity;

authenticating the server as the single unit to the remote management entity based on the server identifier.

17. The method of claim 16, wherein the server identifier comprises a certificate associated with a public key and at least one of: a model number of the controller node or a serial number of the controller node.

18. The method of claim 17, wherein authenticating the server to the remote management entity comprises:

providing the certificate to an authentication service; and authenticating, by the authentication service, the certificate.

19. The method of claim 12, wherein the server identifier comprises a certificate issued by an end user of the server.

20. The method of claim 12, wherein the management component comprises at least one of a physical management component, a logical management component, or an array controller.

21. The method of claim 12, wherein each node of the plurality of nodes are in a rack and wherein each node of the plurality of nodes comprises memory, a resource monitoring and control component, and at least one processor.

22. The method of claim 12, wherein:

each node is associated with a respective drive enclosure; and the complex comprises a drive array comprising the respective drive enclosures.

23. A non-transitory computer-readable medium storing instructions that, when executed on one or more processing devices, cause the one or more processing devices to:

discover a plurality of nodes, wherein the plurality of nodes collectively form a server, and each node of the plurality of nodes is associated with a respective identifier;

determine a node of the plurality of nodes to be a controller node;

first authenticate, at a logical management component of the controller node, a respective identifier associated with each node of the plurality of nodes;

responsive to the first authentication successfully authenticating each node of the plurality of nodes, assign an identifier to the server, wherein the identifier assigned to the server comprises the identifier associated with the controller node, and wherein the server to communicate, as a single unit, with an entity external to the server using the identifier assigned to the server;

extract, from the identifier assigned to the server, a public key; and communicate, by a remote management entity, with the server, wherein the communication comprises authenticating, by the remote management entity, the server based on the identifier assigned to the server.

* * * * *